United States Patent Office 2,894,924
Patented July 14, 1959

2,894,924

SYNTHETIC ELASTOMERIC COMPOSITION CONTAINING BUTADIENE-STYRENE AND A ROSIN SOAP

Joseph Rockoff, Dayton, Ohio, assignor to The Dayton Rubber Company, a corporation of Ohio No Drawing. Application June 19, 1953
Serial No. 362,963

5 Claims. (Cl. 260—27)

The present invention relates to an improved rubber-like composition for use in tires and the like and, in particular, to a synthetic rubber composition such as the butadene-styrene copolymer generally referred to as GR–S or Buna–S, which is mixed with a substantial quantity of a disproportionated rosin derivative.

The use of disproportionated rosin derivatives such as rosin soaps as emulsifying agents or emulsion stabilizers in the emulsion copolymerization of the various synthetic rubbers has been employed for some time. More recently, such rosin derivatives have been added to the rubber-like dispersions in greater quantities to act as diluents or extenders. This use of the larger amounts of the rosin derivatives has been recently exploited by one of the government owned synthetic rubber plants, where the low temperature butadiene-styrene copolymer has been admixed with a rosin soap in the proportions by weight of 20 parts of rosin soap to 100 parts of the copolymer. This particular rubber-like composition or rosin masterbatch as it is called, is known to the industry as GR–S X–732.

While these rosin type copolymers have resulted in certain improved physical properties such as improved ply-separation resistance, higher heat-break resistance and improved wearing characteristics in tire tread compounds, the commercial acceptance of such compounds has been retarded by the fact that their rate of vulcanization has been considerably reduced by the addition of these rosin derivatives with resultant increase in vulcanization time required. It has also developed that, where the rosin is used in relatively large quantities as a diluent or extender, the same has a strong tendency to "bloom" upon aging thus adversely affecting the appearance, tack, and other properties normally desired in a rubber composition.

It is accordingly an object of the present invention to provide a relatively fast curing, non-blooming elastomeric composition.

A further object of the present invention is to provide a synthetic rubber-like composition to which has been added a substantial quantity of a disproportionated rosin derivative as a diluent or extender, which composition may be readily vulcanized and which will be free from rosin blooming upon aging and subsequent use.

It is still a further object of the present invention to provide an improved elastomeric composition based upon the disproportionated rosin extended butadiene-styrene copolymer known as GR–S X–732.

It is yet another object of the present invention to provide such a composition for use in tire treads and the like.

Applicant has discovered that the above-enumerated objects and other desirable results and advantages to be apparent from the following detailed description may be achieved by adding to the rosin-extended synthetic rubber, controlled quantities of a basic substance, more particularly, an alkali metal hydroxide. The amount of alkali necessary to achieve the accelerated rate of vulcanization and non-blooming characteristics above described will vary according to the degree of disproportionation of the rosin derivative, the degree of saponification thereof, the general acidity or alkalinity of the rubber-like composition and the nature of the pigments, loadings, accelerators, antioxidants and other compounding ingredients employed in the elastomeric material.

It has been found that the addition of these alkali metal hydroxides in quantities sufficient to provide from .044 mol to .176 mol or from .75 to 3.0 grams of the hydroxide radical per 100 grams of the rosin derivative as an accelerator activator has a pronounced effect upon the rosin extended rubber-like composition constituting a particular improvement with regard to its rate of vulcanization and its non-blooming tendencies upon aging. This preferred range of weight proportions of the hydroxide to the amount of rosin present in the rosin extended masterbatch will be achieved by adding to the masterbatch (1) from 2.5 to 10.0 parts by weight of potassium hydroxide per 100 parts by weight of the rosin derivative, or (2) from 1.78 to 7.1 parts by weight of the sodium hydroxide per 100 parts by weight of the rosin derivative.

In the GR–S X–732 rosin extended butadiene-styrene copolymer there are present 20 parts by weight of a disproportionated rosin soap known as "Dresinate 731" which is produced in commercially available quantities by the Hercules Powder Company, Wilmington, Delaware. This material is the soap of a dehydrogenated rosin having a relatively high dehydroabietic acid content. A description of this material and its used in GR–S polymerization is set forth in the following publications: (1) "Resin Acid Soap in GR–S Polymerization" by Julian L. Azorlosa appearing in "Industrial and Engineering Chemistry," volume 41, page 1626, August 1949; and (2) "Disproportionated Rosin Soap in GR–S Polymerization" by Hayes, Drake and Pratt appearing in "Industrial and Engineering Chemistry," volume 39, page 1129, September 1947. It has been found that optimum results may be achieved with the use of this particular rosin extended copolymer when from one-half to two parts of potassium hydroxide by weight based upon 100 parts of the butadiene-styrene copolymer and 20 parts of the rosin derivative, or 120 parts of the rosin extended copolymer are used.

The effectiveness of the present invention and the desirable properties to be gained from the used of controlled amounts of the alkali metal hydroxide in the rosin extended masterbatch have been demonstrated by data compiled from the following experimental samples.

Compound A is a typical cold rubber butadiene-styrene copolymer known as GR–S 1500 which is a tread stock compound containing no rosin extender and is used in these experimental results as a control. GR–S 1500 is a typical cold rubber emulsion copolymer of the butadiene-styrene type. This particular compound is composed of the following parts by weight:

| | Parts by weight |
|---|---|
| GR–S 1500 | 100 |
| Carbon black | 50 |
| Zinc oxide | 3 |
| Softener | 11 |
| Stearic acid | 2 |
| Antioxidant | 1 |
| Peptizer (37½% xylyl mercaptan and 60% inert hydrocarbon) | .50 |
| N-cyclohexyl-2-benzothiazole sulfonamide | .85 |
| Sulfur | 1.75 |

Compound B is a secondary control compound based upon the rosin extended butadiene-styrene copolymer above referred to and commonly known as GR-S X-732 which contains 20 parts by weight of the rosin soap for 100 parts by weight of the GR-S copolymer. This compound B is composed of the following parts by weight:

| | Parts by weight |
|---|---|
| GR-S X-732 (containing 20 parts rosin soap and 100 parts GR-S copolymer) | 120 |
| Carbon black | 60 |
| Zinc oxide | 3 |
| Softener | 10 |
| Stearic acid | 2 |
| Antioxidant | 1 |
| Peptizer (xylyl mercaptan and inert hydrocarbon) | .50 |
| Accelerator (N-cyclohexyl-2-benzothiazole sulfonamide) | 1 |
| Sulfur | 2.10 |

Compound C is a third control compound based upon the rosin extended butadiene-styrene copolymer, GR-S X-732 to which a conventional accelerator activator; viz., diphenylguanidine has been added. This compound is composed of the following parts by weight:

| | Parts by weight |
|---|---|
| GR-S X-732 | 120 |
| Carbon black | 60 |
| Zinc oxide | 3 |
| Softener | 10 |
| Stearic acid | 2 |
| Antioxidant | 1 |
| Peptizer (xylyl mercaptan and inert hydrocarbon) | .50 |
| Accelerator activator (diphenylguanidine) | .35 |
| Accelerator (N-cyclohexyl-2-benzothiazole sulfonamide) | 1 |
| Sulfur | 2.10 |

Compounds D, E and F represent three experimental compounds based upon the rosin extended butadiene-styrene copolymer to which varying amounts of potassium hydroxide were added as an accelerator activator in lieu of the conventional diphenylguanidine employed in compound C. These compounds are composed of the following parts by weight:

COMPOUND D

| | Parts by weight |
|---|---|
| GR-S X-732 | 120 |
| Carbon black | 60 |
| Zinc oxide | 3 |
| Softener | 10 |
| Stearic acid | 2 |
| Antioxidant | 1 |
| Peptizer (xylyl mercaptan and inert hydrocarbon) | .50 |
| Potassium hydroxide | .50 |
| Accelerator (N-cyclohexyl-2-benzothiazole sulfonamide) | 1 |
| Sulfur | 2.10 |

COMPOUND E

| | Parts by weight |
|---|---|
| GR-S X-732 | 120 |
| Carbon black | 60 |
| Zinc oxide | 3 |
| Softener | 10 |
| Stearic acid | 2 |
| Antioxidant | 1 |
| Peptizer (xylyl mercaptan and inert hydrocarbon) | .50 |
| Potassium hydroxide | 1 |
| Accelerator (N-cyclohexyl-2-benzothiazole sulfonamide) | 1 |
| Sulfur | 2.10 |

COMPOUND F

| | Parts by weight |
|---|---|
| GR-S X-732 | 120 |
| Carbon black | 60 |
| Zinc oxide | 3 |
| Softener | 10 |
| Stearic acid | 2 |
| Antioxidant | 1 |
| Peptizer (xylyl mercaptan and inert hydrocarbon) | .50 |
| Potassium hydroxide | 2 |
| Accelerator (N-cyclohexyl-2-benzothiazole sulfonamide) | 1 |
| Sulfur | 2.10 |

The physical properties of these compounds as they vary with different periods of vulcanization are shown in the following tables. In Table I, the modulus in pounds per square inch for a 300% deformation is shown in the horizontal lines opposite each of the enumerated compounds, the vertical columns being confined to the same period of vulcanization. Table II is a similar table showing the Shore A Durometer hardness of the vulcanized compounds. Table III is a similar table showing the tensile strength of the compounds after they have been cured the designated periods of time.

*Table I*

[Vulcanizing time at 280° F.—300% modulus.]

| | 30 Min. | 45 Min. | 60 Min. | 90 Min. | 120 Min. |
|---|---|---|---|---|---|
| Compound A | 260 | 850 | 1,235 | 1,560 | 1,785 |
| Compound B | 90 | 200 | 405 | 815 | 1,145 |
| Compound C | 95 | 335 | 615 | 1,170 | 1,335 |
| Compound D | 150 | 525 | 815 | 1,190 | 1,525 |
| Compound E | 190 | 775 | 1,000 | 1,475 | 1,605 |
| Compound F | 1,645 | 1,785 | 2,280 | 2,070 | 2,115 |

*Table II*

[Vulcanizing time at 280° F.—Shore A Hardness.]

| | 30 Min. | 45 Min. | 60 Min. | 90 Min. | 120 Min. |
|---|---|---|---|---|---|
| Compound A | 48 | 55 | 58 | 60 | 60 |
| Compound B | 45 | 48 | 51 | 54 | 56 |
| Compound C | 46 | 50 | 52 | 54 | 56 |
| Compound D | 50 | 54 | 54 | 57 | 58 |
| Compound E | 50 | 53 | 56 | 58 | 59 |
| Compound F | 73 | 76 | 77 | 78 | 77 |

*Table III*

[Vulcanizing time at 280° F.—Tensile Strength.]

| | 30 Min. | 45 Min. | 60 Min. | 90 Min. | 120 Min. |
|---|---|---|---|---|---|
| Compound A | 590 | 2,185 | 2,920 | 3,305 | 3,495 |
| Compound B | 175 | 665 | 1,360 | 2,615 | 3,120 |
| Compound C | 330 | 1,440 | 2,430 | 3,280 | 3,500 |
| Compound D | 490 | 1,805 | 2,675 | 3,395 | 3,725 |
| Compound E | 840 | 2,620 | 3,175 | 3,505 | 3,560 |
| Compound F | 3,370 | 3,370 | 3,645 | 3,375 | 3,455 |

From the above recipes and tables, it can be seen that the test compounds are substantially identical except for the amount and type of material employed as an accelerator activator. It will be noted that compound B which is the rosin extended cold rubber GR-S control compound containing no accelerator activator, possesses considerably reduced modulus, less hardness and reduced tensile strength as compared with the standard cold rubber compound A containing no rosin derivative extender at all in the respective stages of curing or vulcanization. Compound C which differs from compound B only in the addition of the diphenylguanidine, the conventional accelerator activator, showed only slightly improved physical properties with regard to modulus, hardness and tensile strength as compared with those of compound B containing no activator.

Where, however, the alkali metal hydroxide such as the potassium hydroxide was added in lieu of the diphenylguanidine as an activator for the accelerator (N-cyclohexyl-2-benzothiazole sulfonamide) as in compounds D, E and F, immediate improvement in the physical properties was noted. Compound D containing only one-half part by weight of the potassium hydroxide based upon 120 parts by weight of the rosin extended hydrocarbon, while being slightly softer and of a lower modulus than the control compound A evinced a considerably improved tensile strength. Compound E to which had been added one part by weight of the potassium hydroxide based upon 120 parts of the rosin masterbatch compared favorably with the control compound A, there being only inconsequential variation between the physical properties of the two.

Compound F, on the other hand, to which had been added two parts of potassium hydroxide based upon 120 parts of the rosin masterbatch demonstrates that the practical limit of the proportions of potassium hydroxide occurred at this point in view of the fact that the extremely high modulus and hardness, particularly after vulcanization for only thirty minutes at temperatures of 280° F. would render this compound difficult to process in view of its low scorch point, and toughness that would resist milling and calendering.

While results substantially identical with those outlined above in connection with the rosin extended masterbatches containing the potassium hydroxide as an accelerator activator were achieved when this potassium hydroxide was replaced with sodium hydroxide, the use of alkaline earths, specifically calcium oxide, as an activator failed in most instances to bring the vulcanizate up to the modulus, tensile strength and hardness of the rosin masterbatch containing no activator whatsoever.

In addition to the properties considered in the above tables in which the compounds containing the potassium hydroxide were found to excel, it was also found that these potassium hydroxide containing compounds were capable of being more easily removed from the Banbury in which they had been mixed. It was found further that of all of the compounds based upon the rosin derivatives extended GR-S composition, only those containing the potassium hydroxide showed no "blooming" upon aging.

While in the above description the function of the potassium hydroxide has been referred to as the activation of the accelerator employed in the compounds, the exact nature of the reaction of the potassium hydroxide with the composition is obscure, and it is not intended that the present invention should be limited to this theory of the effectiveness of the potassium hydroxide. Rather is this invention to be limited only by the definition thereof in the subjoined claims.

I claim:
1. A fast-curing, non-blooming solid elastomeric composition comprising a butadiene-styrene polymer to which has been added 20 parts by weight of a disproportionated rosin soap and from ½ to 2 parts by weight of potassium hydroxide based upon 100 parts of the copolymer, said soap and hydroxide being intimately admixed with and incorporated into said composition.

2. A fast-curing, non-blooming solid elastomeric composition comprising a butadiene-styrene copolymer to which has been added 20 parts by weight of a disproportionated rosin soap and from .36 to 1.4 parts by weight of sodium hydroxide based upon 100 parts by weight of the butadiene-styrene copolymer, said soap and hydroxide being intimately admixed with and incorporated into said composition.

3. A non-blooming, fast-curing rosin extended solid rubber composition comprising a cold rubber butadiene-styrene copolymer to which has been added 20 parts by weight of the soap of a dehydrogenated rosin having a high dehydroabietic acid content in the copolymerization solution and from ½ to 2 parts by weight of potassium hydroxide added as a compounding ingredient, all parts by weight being based upon 100 parts by weight of the copolymer, said soap and hydroxide being intimately admixed with and incorporated into said composition.

4. A non-blooming, fast-curing rosin extended solid rubber composition comprising a cold rubber butadiene-styrene copolymer to which has been added 20 parts by weight of the soap of a dehydrogenated rosin having a high dehydroabietic acid content in the copolymerization solution and from .36 to 1.4 parts by weight of sodium hydroxide added as a compounding ingredient, all parts by weight being based upon 100 parts by weight of the copolymer, said soap and hydroxide being intimately admixed with and incorporated into said composition.

5. A fast-curing, non-blooming solid elastomeric composition comprising a butadiene-styrene copolymer to which has been added 20 parts by weight of a disproportionated rosin soap and from ½ to 2 parts by weight of alkali metal hydroxide based upon 100 parts of the copolymer, said soap and hydroxide being intimately admixed with and incorporated into said composition.

References Cited in the file of this patent
UNITED STATES PATENTS

| | | |
|---|---|---|
| 2,310,972 | Livermore et al. | Feb. 16, 1943 |
| 2,450,578 | Brown | Oct. 5, 1948 |
| 2,486,183 | Long et al. | Oct. 25, 1949 |
| 2,568,950 | Crouch | Sept. 25, 1951 |
| 2,569,447 | Borglin et al. | Oct. 2, 1951 |
| 2,638,460 | Crouch | May 12, 1953 |